United States Patent
Kempf et al.

(10) Patent No.: US 6,231,799 B1
(45) Date of Patent: May 15, 2001

(54) USE OF THERMOPLASTIC POLYMETHYLMETHACRYLATE MOLDING COMPOSITIONS

(75) Inventors: Peter Kempf, Rodenbach; Norbert Brand, Darmstadt; Helmut Schwind, Hanau; Stefan Roth, Darmstadt; Holger Moritz, Mainz, all of (DE)

(73) Assignee: Roehm GmbH, Darmstadt (DE)

( * ) Notice: Subject to any disclaimer, the term of this patent is extended or adjusted under 35 U.S.C. 154(b) by 0 days.

(21) Appl. No.: 09/251,618

(22) Filed: Feb. 17, 1999

(30) Foreign Application Priority Data

Feb. 18, 1998 (DE) .............................. 198 06 749

(51) Int. Cl.⁷ .................. B29C 43/02; B29C 45/00
(52) U.S. Cl. ................ 264/319; 264/328.1; 264/331.18; 264/334
(58) Field of Search ................ 264/328.1, 319, 264/331.18, 334

(56) References Cited

U.S. PATENT DOCUMENTS

| | | | |
|---|---|---|---|
| 4,369,296 | * 1/1983 | Podszun et al. | 526/209 |
| 4,877,853 | * 10/1989 | Siol et al. | 526/329.7 |
| 5,087,510 | * 2/1992 | Tokas | 428/209 |
| 5,142,008 | * 8/1992 | Holle et al. | 526/318.4 |
| 5,376,317 | 12/1994 | Maus et al. | |
| 5,581,416 | * 12/1996 | Asai | 359/855 |

FOREIGN PATENT DOCUMENTS 3612791  10/1987 (DE) .
0618240  10/1994 (EP) .

OTHER PUBLICATIONS

European Search Report, Jul. 8, 1999.
Patent Abstracts of Japan, 53121890, Jan. 4, 1977.
Patent Abstracts of Japan, 53121891, Jan. 4, 1977.
Patent Abstracts of Japan, 53121892, Jan. 4, 1977.
German Official Action, dated Feb. 18, 1999.

* cited by examiner

Primary Examiner—Leo B. Tentoni
(74) Attorney, Agent, or Firm—Oblon, Spivak, McClelland, Maier & Neustadt, P.C.

(57) ABSTRACT

Substantially sulfur free thermoplastic PMMA containing molding compositions are utilized with non-ferrous metal tools for the manufacture of molded articles. The use of such molding materials having a sulfur content of less than 50 ppm reduces the wear on the non-ferrous metal tools, particularly when utilized with injection molding and pressure molding. As a result of the use of sulfur free molding masses where it necessary to utilize tools of non-ferrous metal, there is a substantial economic advantage in the use thereof.

16 Claims, 6 Drawing Sheets

USE OF THERMOPLASTIC POLYMETHYLMETHACRYLATE MOLDING COMPOSITIONS

FIELD OF THE INVENTION

The use of thermoplastic polymethylmethacrylate (hereinafter PMMA) molding compositions or batches for the formation of molded objects, in particular, by compression molding or injection molding. The production of objects of synthetic material which are required in large numbers are economically produced by injection molding procedures. Where such objects have a complex geometry which must be molded or cast with the highest precision galvanically constructed inserts, the so called electrotypes, are often integrates into the injection molding tool. The advantage of this technology, is that many galvano inserts can be taken off from a "master" and thus, the expense of the tools can be lowered.

DISCUSSION OF THE PRIOR ART

In the workup of PMMA molding compositions or batches on non-ferrous metal tools for example, in the above described electrotypes such as machine parts, more or less strong wear appearances have been noted according to the insertion area and work-up parameters. Because of this, the tools, as well as the machine parts become unusable after a particular time, since the produced molded parts no longer have the desired quality. The main problem herein is damage to the surface (polish). Because of flaking off of black covering of the tool or machine parts there can also result impurities in the formed objects themselves.

Heretofore, it had been assumed that these problems resulted from high temperatures which occurred as the result of compression of air in the casting tools. In particular, in narrow spaces in the molds small air bubbles remained which were strongly compressed by the injection pressure. The manufacturers of PMMA molding compositions therefore recommended operation at the lowest temperatures possible and provision of good ventilation in order to avoid the above mentioned problems.

SUMMARY OF THE INVENTION

It is the purpose of the present invention to reduce the wear on non-ferrous metal work tools and machine parts in an effective manner. It is further the task of the present invention to improve the quality of PMMA molded parts, in particular with respect to their purity and surface quality. These tasks are solved including not explicitly named tasks, which can be deduced from the context set forth herein, by the use of substantially sulfur free PMMA molding compositions or batches.

The use of substantially sulfur free thermoplastic polymethylmethacrylate molding compositions or batches for the formation of molded objects with non-ferrous metal containing tools results in the effective reduction of wear on the non-ferrous metal tools and machine parts. In particular, among other things, the chemical corrosion of the metal to metal sulfides is prevented. Such a situation is most surprising since the sulfur content of commercially available molding compositions is only 500 to 800 ppm. Furthermore, the bulk of the sulfur content is due to so called molecular weight modifiers. These are, for the most part, built into the polymer via covalent bonding. The concept of essentially "sulfur free" as used herein is that no sulfur containing modifiers are present and that the sulfur content of the PMMA molding compositions is less than 50 ppm, preferably less than 30 ppm, most preferably less than 10 ppm and most desirably less than 5 ppm.

Thermoplastic PMMA molding compositions are homo or co-polymers formed through the polymerization of methylmethacrylate alone, or in combination with one or more ethylenically unsaturated monomers and which can be thermoplastically processed.

Non-ferrous metal tools are tools in particular inserts, nozzles or channels which contain non-ferrous metals. Under non-ferrous metals one understands those metals which form substantially insoluble sulfides. Belonging to this group, but not restricted thereto, are nickel, copper, alloys of these two metals with another, as well as of both of these metals such as with beryllium, zinc or tin. The mode of production of the molded objects from the above-identified PMMA compositions can take place by means well known to those skilled in the art. Included in these methods are, in particular, extrusion, injection molding and compression molding. Preferred therein being injection molding and compression molding.

DESCRIPTION OF THE PREFERRED EMBODIMENTS

The above-identified PMMA molding compositions are molding compositions which involve PMMA, homo and/or copolymers which may be obtained by the polymerization of I. 5 to 100 wt % preferably 50 to 100 wt % and particularly preferred, being 80 to 100 wt % of methylmethacrylate.

II. 0 to 95 wt %, suitably 0 to 50 wt % and particularly preferred, being 0 to 20 wt % of one or several ethylenically unsaturated monomers copolymerizable with (I) whereby, (I) and (II) together yield 100 wt %.

III. 0.05 to 5 wt % relative to 100 wt % of the sum of (I) and (II) of a substantially sulfur free molecular weight modifier and, IV. up to 100 wt % relative to the sum of (I) and (II) of conventional additives to thermoplastic mold compositions, and which have an weight average molecular weight of from $2\times10^4$ to $3\times10^5$ preferably, between $5\times10^4$ to $2.5\times10^5$ particularly being preferred, $8\times10^4$ to $2\times10^5$.

The component (I) is commercially obtainable. Its weight proportion amounts to 5 to 100 wt %, preferably 50 to 100 wt %, most preferably 80 to 100 wt %. If the weight proportion is less than 5 wt %, then the qualities of the methylmethacrylate components do not appear.

The members of the group which comprise the ethylenically unsaturated monomers which form component (II) in the PMMA molding mass other than the methylmethacrylate, include among others, vinyl esters, esters of acrylic acid such as methyl and ethyl acrylate, esters of methacrylic acid which differ from methylmethacrylate for example, tertbutyl methacrylate, n-butyl methacrylate, ethylhexyl methacrylate, as well as cycloalkyl acrylates and cycloalkyl methacrylates, vinyl chloride, vinylidinechloride, vinyl acetate, styrene, substituted styrene with alkyl substituents in the side chain such as, for example, α-methylstyrene and α-ethylstyrene, substituted styrenes having alkyl substituents in the ring such as, for example, vinyltoulene and p-methylstyrene, halogenated styrene, such as monochlorostyrene, dichlorostyrene and tribromostyrene vinyl and isopropenylethers, maleic acid derivatives for example, maleic anhydride, methylmaleic anhydride, maleimide, methylmaleimide, phenylmaleimide, and cyclohexylmaleimide and dienes, such as, for example, 1,3-butyidiene, and divinylbenzene. Particularly preferred are acrylic esters and methacrylic acid esters which are different from those in (I), vinyl acetate, vinyl chloride, vinylidene chloride, styrene, α-methylstyrene, halosubstituted styrene, vinylethers, isopropenylether and dienes.

All of the above-identified monomers commercially available. They are utilized in amounts of 0 and 95 wt % suitably 0 to 50 wt % of particularly preferred in amounts of 0 to 20 wt % relative to the total amounts of monomeric components and are co-polymerized with methyl methacrylate. If their weight proportion is greater than 95% then the properties of methylacrylic acid components (I) do not appear.

As components (III) in accordance with the present invention, for the control of molecular weight, sulfur free controllers are utilized. Without being limited thereto in accordance with the present invention as examples of sulfur free molecular weight modifiers there may be mentioned dimeric-α-methylstyrene (2,4 diphenyl 4-methyl-1-pentene), enolethers of aliphatic and/or cycloaliphatic aldehydes, terpenes, 62-terpinene, terpinolene, 1,4-cyclohexadiene, 1,4-dihydronaphthalene, 1,4,5,8-tetrahydronaphthalene, 2,5-dihydrofuran, 2,5-dimethylfuran and/or 3,6-dihydro-2H-pyran, of which preferred is dimeric a-methylstyrene.

These sulfur free molecular weight modifiers are utilized in quantities of between 0.05 to 5 wt %, preferably 0.1 to 2 wt % relative to 100 wt % of all of the monomeric components utilized. Where the weight proportion of the molecular weight modifiers is greater than 5 wt % the weight mean molecular weight of polymers becomes too small. Where the weight proportion of the molecular weight modifier is smaller than 0.5 wt %, the weight mean molecular weight of the polymers becomes to large. These modifiers are available in the stream of commerce. They may be utilized by methods well known by those skilled in the art. The formation of dimeric α-methylstyrene is described in German Patent DE 966 375. Enolethers of an aliphatic and/or cycloaliphatic aldehydes are described in German Patent DE 3 030 373. The formation of terpenes is set forth in EP 80 405. The disclosures of JP 78/121 891 and JP 78/121 890 describe the formation of β-terpinenes, terpinolene, 1,4-cyclohexadien, 1,4- dihydronapthalene and 1,4,5,8-tetrahydronapthalene. The formation of 2,5-dihyrofuran, 2–5-dimethylfuran and 3,6-dihyro-2H-pyran are set forth in the German patent application DE 2 502 283.

The usual additives for PMMA batch molds for thermoplastic batch molds which comprise component (iv) may be utilized.

The following additives may be utilized:

Antistatic agents, antioxidants, biostabilizers, chemical blowing agents, releasing agents, antiflame agents, lubricants, coloring materials, flow improvers, fillers, light protecting materials, optical color brighteners, organic phosphites, pigments, impact resistance improvers, crosslinking agents, reinforcing agents, reinforcing fibers, weather protective agents and softeners. With respect to these suitable additives, care must be taken that these are substantially sulfur free.

These additives are added in the usual amounts, that is to say, up to 100 wt % preferably up to 10 wt % relative to the sum of components (I) and components (II). Where the quantity of additives is greater than 100% relative to the sum of components (I) and (II) there may be an negative influence on the properties of the molding charge such as, for example, workability and/or mechanical properties.

The molding compositions utilizable in the present invention may contain often polymers for the modification of their properties. These polymeric mixtures are known to those skilled in the art as blends. Without thereby restricting the scope of this invention, there may be included those which are obtained through free radical polymerization of the above-identified monomers or mixtures of these monomers as well as polycarbonates, polyesters, polyamides polyimides, polyurethanes and polyethers.

The weight average molecular weight of the homo or copolymers of the present invention generally lie between 20,000 and 300,000 preferably, between 50,000 and 250,000 most suitably between 80,000 and 200,000. If the weight mean molecular weight is smaller than 20,000 then the molding batch loses its mechanical properties. On the other hand, if the weight mean molecular weight is higher than 30,000 then the molding batch will experience difficulty working as a thermoplastic.

The production of the homo or copolymers which are utilized in accordance with the present invention may be prepared by different free radical polymerization methods which are themselves known to the art.

Thus, the polymers may be produced in substance polymerization, solution polymerization, suspension polymerization or emulsion polymerization. Substance polymerization methods are set forth in Houben-Weyl, vol. E20, part 2 (1987) pages 1145, et seq. Valuable directions as to solution polymerization may be found in the same place at pages 1156, et seq. Explanations as to suspension polymerization technology would be found on page 1149 et seq. and emulsion polymerization on page 1150 et seq.

It is preferred to provide the polymers to be utilized in granular form. These molding batch granulates are suitable for further processing by pressure molding, extrusion, or injection molding. The formation of molding batch granulates results from extrusion and granulation of the plate or pearl formed provided synthetic materials whereby, the low molecular accompanying materials of the polymers are separated by de-gassing in the extruder and the above-identified supplemental materials are added during the extrusion process. Such procedures are set forth in the handbook entitled "Kuntstoff Extrusion Technique", volumes 1 and 2 (editors F.

Heusen, W. Kappe, H. Potente; published by Hauser Verlag 1986 and 1989.

The particular commercial value of the use of the molding compositions of the present invention occurs where, for technical reasons only, tools of non-ferrous metals may be utilized. That is to say, where the utilization of these metals has an economic advantage.

Thus, microstructures especially optical structures can often only be produced by galvanic casting methods. Forming tools in which reflectors for motor vehicles are produced are for example, built from packages of precisely sharpened and polished steel rods. These tools are very expensive so that for commercial reasons many galvanic nickel copies are made and these are utilized as tool inserts.

Because good heat conductivity hot channel nozzles or distribution channels in tools and machines are often made using copper alloys. When these are contacted with a sulfur containing melt, a black coating is formed on the surface from which black particles are often carried along in the molded part. These black particles are particularly disturbing in optical uses for example, magnifying glasses, lenses, light leaders, and viewing parts and lead to their rejection.

The procedures of the present invention reduce these disadvantages. The following examples, as well as, the figures attached hereto demonstrate the object of the invention.

BRIEF DESCRIPTION OF THE DRAWINGS

The Figures summarized below are intended to elucidate but not limit the present invention.

EXAMPLE 1

Synthesis of a PMMA Composition

Production Example: A solution of 940 parts of methyl methacrylate (MMA), 60 parts, n-Butyl acrylate, 8 parts dimeric α-methylstyrene and 9 parts of dilauroyl peroxide were suspended in 2000 parts of water in which 1.1 parts of an ammonium salt of a water soluble co-polymer of MMA and methylacrylic acid were dissolved, and the suspension was polymerized for two hours at 78° C. and 1 hour at 49° C.

The thus obtained polymerized particles were filtered off and thoroughly washed with deionized water and dried at 80° C. There were obtained 970 parts of clear polymerized particles having a melt index in accordance with DIN 7745 of 2.8 g/10 min.

EXAMPLE 2

Synthesis of Another PMMA Composition

To a 5 liter polymerization vessel comprising stirrer, reflux condenser and thermometer there was charged a mixture of 3200 g deionized water, 64 grams of a 6% aqueous solution of the ammonium salt of a methyl methacrylate methacrylic acid copolymer and warmed to 40° C. Under stirring, there was added a mixture comprising 92.4 parts by weight of methyl acrylate, 5.9 parts by weight of butyl acrylate, 0.8 parts by weight of dimeric-α-methylstyrene and 0.9 parts by weight of dilauroyl peroxide.

The mixture was polymerized for 2 hours at 78° C. and 1 hour at 98° C. and then cooled to ambient temperature. The polymerized particles were filtered off, thoroughly washed with deionized water and dried in a vortex bed drier at 80° C.

There were obtained 1565 grams of clear polymerized particles having a melting index according to DIN 7745 of 2.4 g/10 min.

EXAMPLE 3

Pressure Molding Testing of 3 Different PMMA Molding Compositions Having a Different Sulfur Content in the Presence of Nickel Insert Tools Plexiglass® 7N (manufactured by Rohm) at a content of 725 ppm of sulfur, Lucryl® G 66 Q 14 (manufactured by BASF) had a sulfur content of approximately 630 ppm and a molding batch prepared in accordance with Example 2 which had no detectable sulfur content.

The pressure molding was carried out under the following operating parameters.

Tool temperatures: ca. 160–200° C.

Molding pressure: 100–500 bar.

Pressure Time: 5 to 60 minutes.

Figure 1:
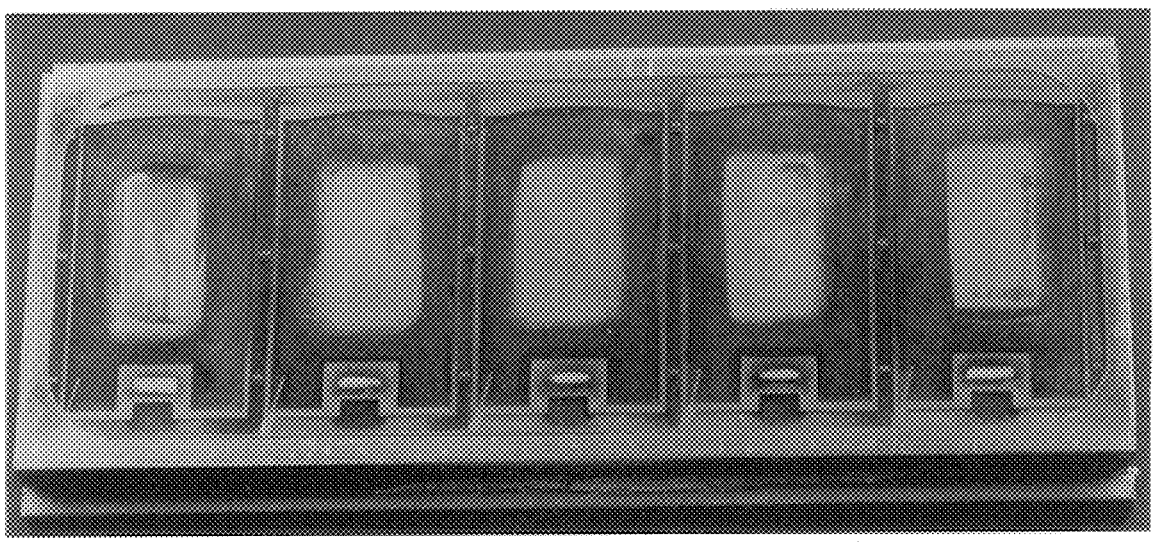
FIG. 1 is a plan view of a tool insert in which a molding batch containing 725 ppm sulfur content has been utilized 34 times.
Figure 2:
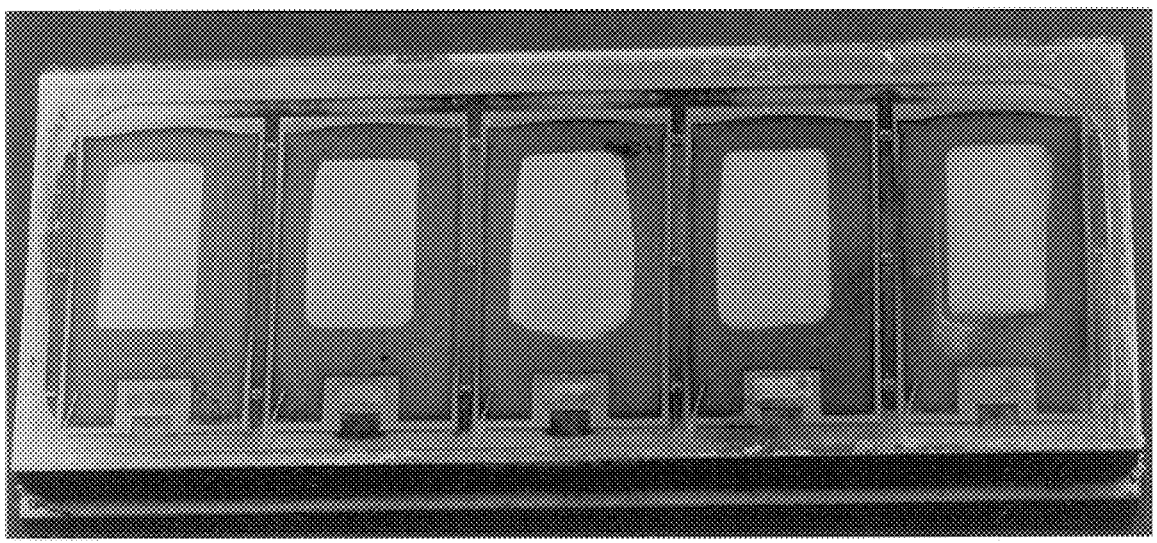
FIG. 2 is a plan view of tool insert in which the molding batch having a sulfur content of 630 ppm was utilized 100 times.

In FIGS. 1 and 2 it is shown that the tool inserts in this procedure which were worked with sulfur containing molded batches corroded very rapidly and thus became unusable. The illustrated tool parts are shown in 5 segments. The form-providing areas occur at the edges of the individual tools, it is there that the disturbing corrosion is noted. Depending on the sulfur content and the work parameters, the following results were obtained.

725 ppm sulfur: unusable after 34 procedures (see FIG. 1).

630 ppm sulfur: unusable after 100 cycles (see FIG. 2).

Figure 3:
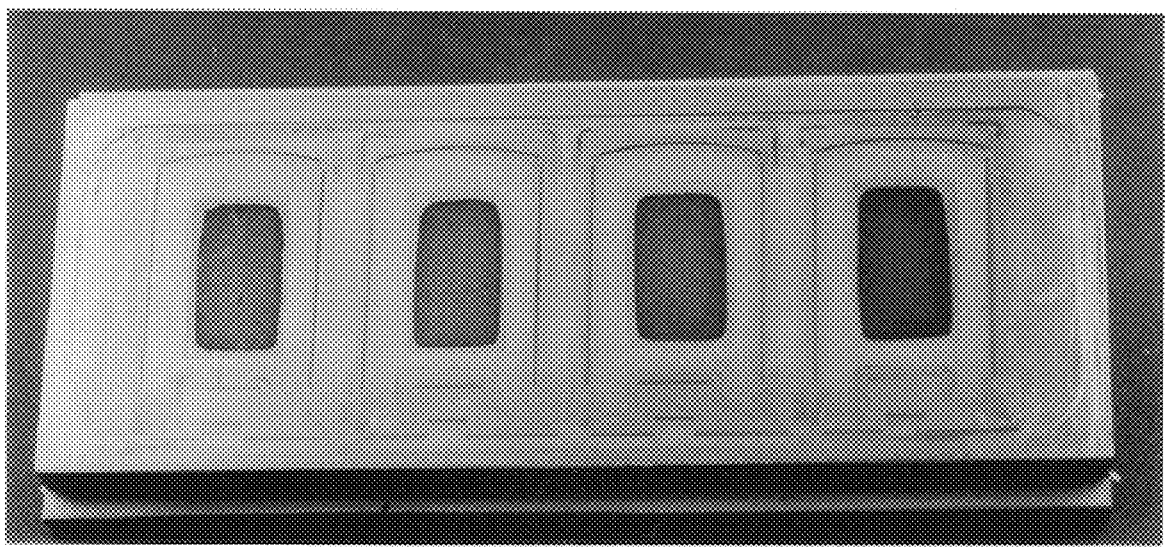
FIG. 3 is a plan view of tool insert in which a molding batch without measurable sulfur content was utilized 360 times.

No sulfur; still undamaged after 360 cycles (see FIG. 3).

The nickel surface of the work tool inserts in which sulfur containing molding materials were utilized became black. In these particular places the occurrence of sulfur is provable.

Figure 4:
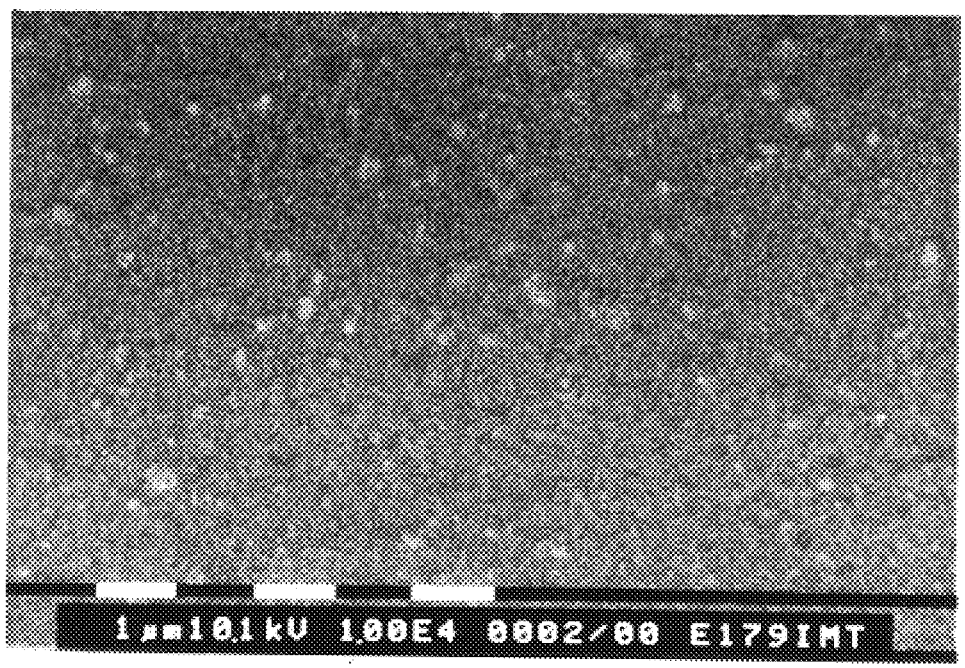
FIG. 4 is a scanning electronmicrograph (Magnification× 3000) of the surface of a tool insert in which a molding batch containing 725 ppm sulfur content was utilized 34 times.

The appropriate analysis carried out with respect to the foregoing work tool inserts. FIG. 4 (34 cycles, sulfur content 725 ppm), and FIG. 5 (100 cycles, sulfur content 630 ppm) and FIG. 6 (360 cycles no sulfur content) show scanning electronmicrographs of the tool inserts.

Figure 5:
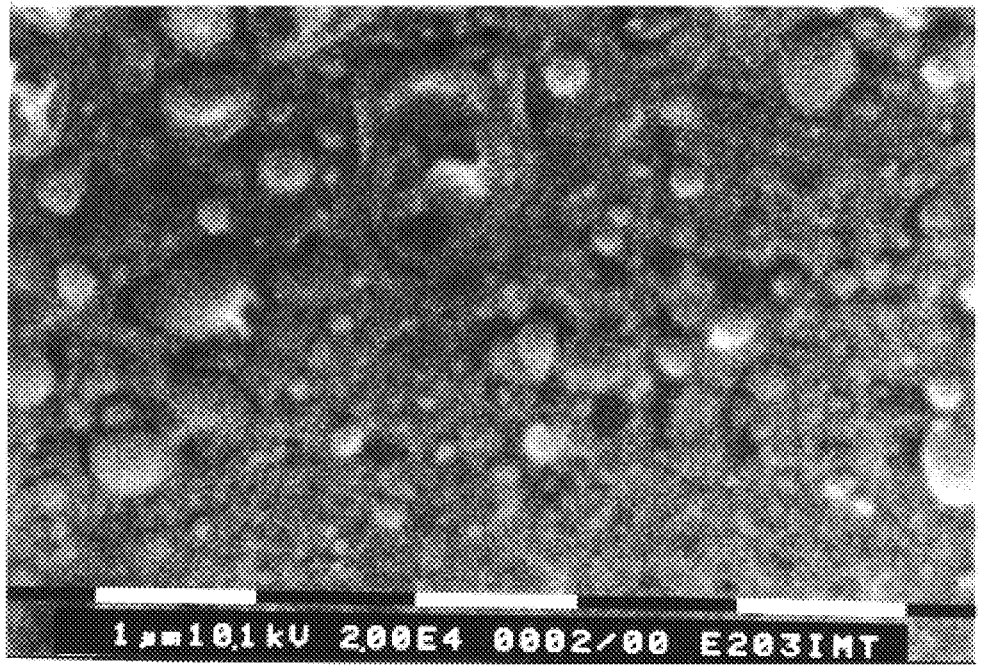
FIG. 5 is a scanning electronmicrograph (Magnification× 1000) of the surface of a tool insert where the molding batch contained 630 ppm of sulfur which was utilized 100 times.
Figure 6:
FIG. 6 is a scanning electronmicrograph (Magnification× 300) of the surface of a tool insert in which a molding mass containing an unmeasurable amount of sulfur was utilized 360 times.

The wear on the surface is clearly shown in FIGS. 4 and 5 as a rough surface in comparison to that produced in FIG. 6.

Figure 7:
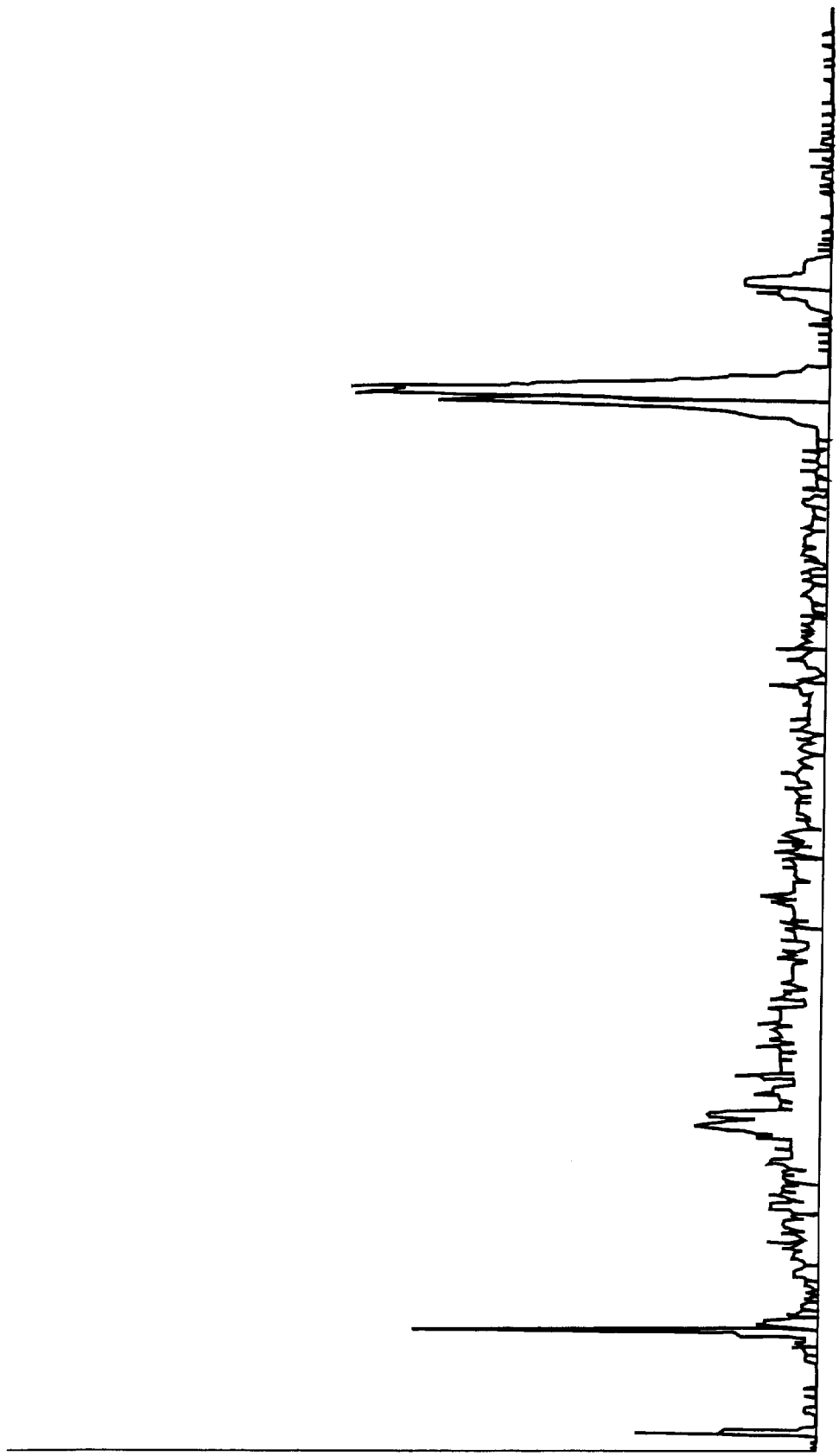
FIG. 7 is a scanning electronmicrograph spectrum (X axis: 0 to 10 KeV, Y axis 0–6.4 counts×$10^3$) of the surface of a tool insert in which a mold batch containing 725 ppm of sulfur was utilized 34 times.
Figure 8:
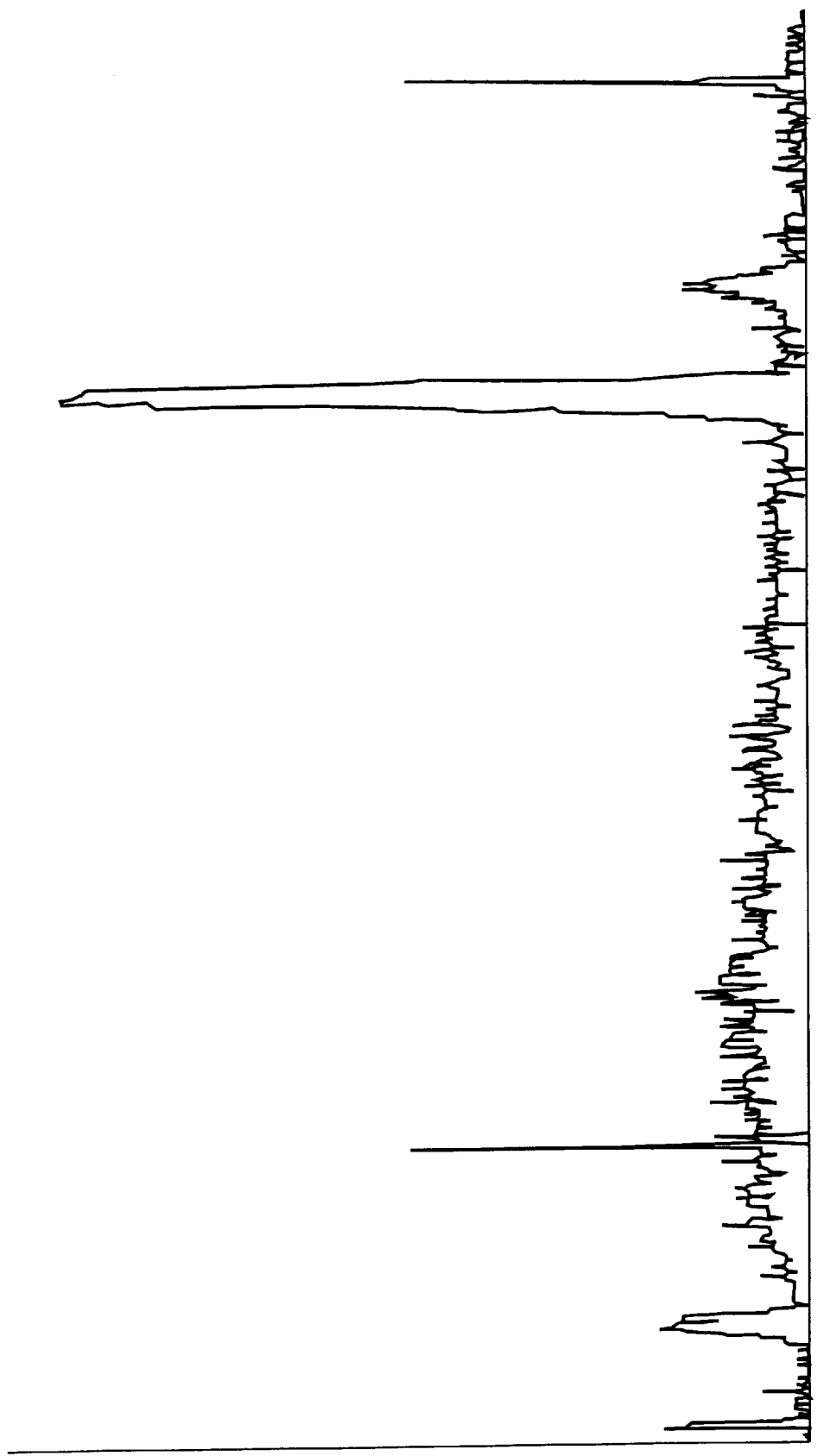
FIG. 8 is a scanning electronmicrograph spectrum (X axis: 0 to 10 KeV, Y axis 0–6.4 counts×$10^3$) of the surface of a tool insert in which the mold batch containing 630 ppm of sulfur was utilized 100 times.
Figure 9:
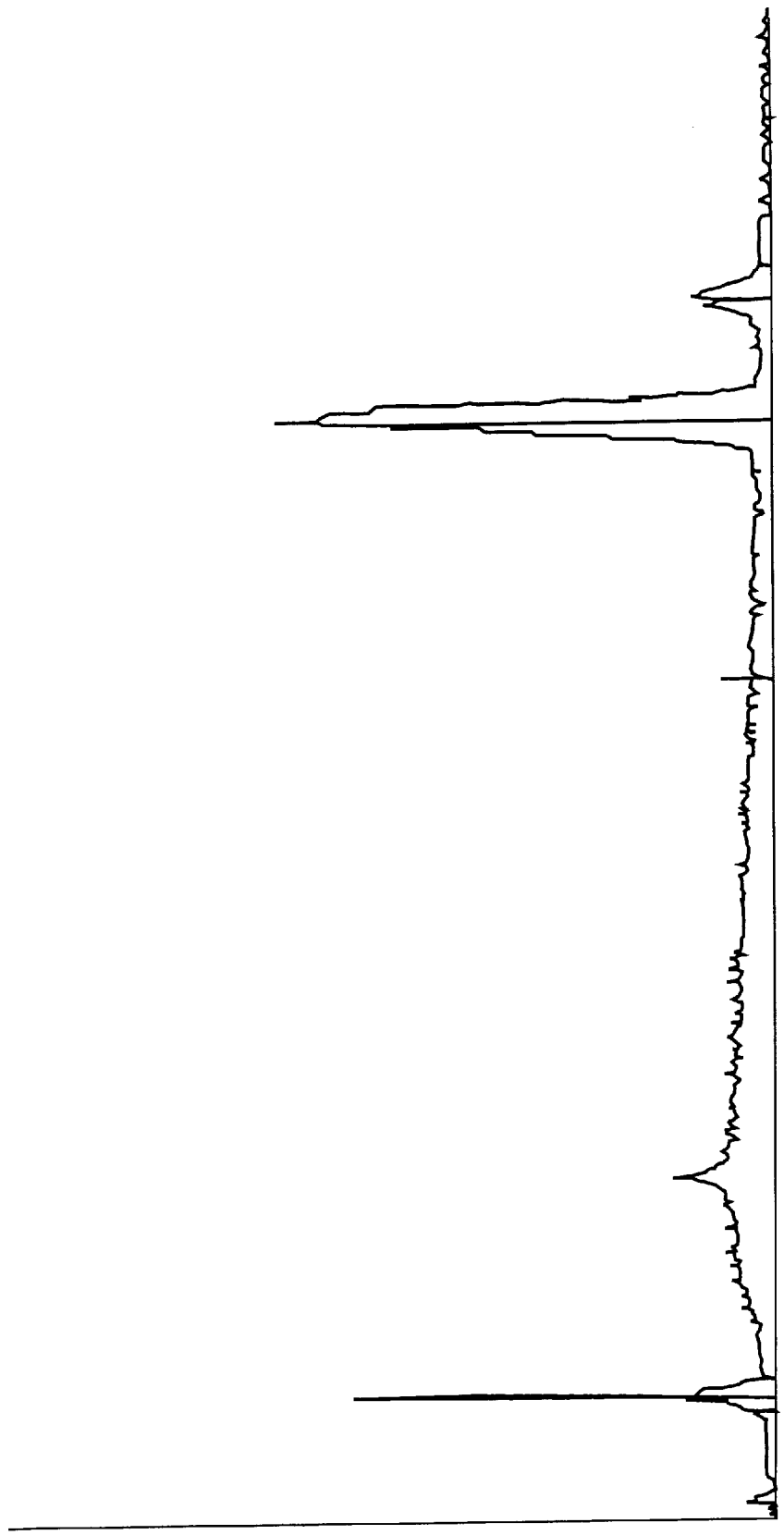
FIG. 9 is a scanning electronmicrograph spectrum (X axis: 0 to 10 KeV, Y axis 0–10.2 counts×$10^4$)of the surface of a tool insert in which a mold batch containing less than a measurable amount of sulfur was utilized 360 times.

FIG. 7 (34 cycles, sulfur content 725 PAM, FIG. 8 (100 cycles, sulfur content 630 ppm) and FIG. 9 (360 cycles, no sulfur content) show scanning electronmicrograph spectra from which the sulfur content of the surface of the tool insert can be deduced.

The proof of sulfur under the scanning electronmicroscope is achieved by energy dispersive x-ray microanalysis. In this procedure, an electron stream (20 000 volts) is energized. In this test, activation of elements having atomic number greater than 12, generates x-rays. By this activation, every element emits characteristic energies wherein the amount of the emitted radiation is a measure of the content of the element in the test. As detector there is utilized a multi-channel analyzer (1024 channels at 20 eV).

This shows that the surfaces of the tool inserts in which sulfur containing mold compositions ere utilized contained sulfur, which is not found in the surface of the tool insert treated with molding batches free of sulfur.

EXAMPLE 4

Injection Molding with Brass Inserts

The following molding batches were utilized.

Resarit® 830 ZK (manufactured by Resart-IHM AG) having a sulfur content of 365 ppm.

Degalan® G7E manufactured by Degussa having a sulfur content of 520 ppm and a molding batch prepared in accordance with that Example 2 hereof having no detectable sulfur content. The injection molding was carried out under the following work parameters.

Charge temperature: 220–260° C.

Tool temperatures: 60–80° C.

Injection pressure: 500–1000 bar.

Cycle time: circa 30 seconds.

The following differences were determined with the foregoing production.

PMMA with 520 ppm sulfur, production had to be interrupted after 16 hours because of tarnishing of the tools were certain necessitated polishing thereof.

PMMA with 365 ppm sulfur, production had to be interrupted after 26 hours due to tarnishing of the tools requiring re-polishing.

PMMA without sulfur, no tarnishing at all. The black coating was determined by scanning electronmicroscope analysis to be copper sulfide.

Further advantages and embodiments of the invention can be determined from the following claims.

We claim:

1. A process for the production of a molded article from a molding composition comprising substantially sulfur-free thermoplastic PMMA, comprising molding said composition in a mold comprising non-ferrous metal tool inserts to make a molded article.

2. The process as claimed in claim 1, comprising injection molding said composition in a mold comprising non-ferrous metal tool inserts.

3. The process as claimed in claim 1, comprising pressure molding said composition in a mold comprising non-ferrous metal tool inserts.

4. The process as claimed in claim 1 wherein the molding composition comprises homo and/or copolymers of PMMA obtained by the polymerization of (I) between 80 to 100 wt % of methylmethacrylate, (II) 0 to 20 wt % of one or more ethylenically unsaturated monomers copolymerizable with said methylmethacrylate, wherein the sum of (I) and (II) yields 100 wt %, (III) 0 to 0.05 to wt % relative to the foregoing 100 wt % of the sum of (I) and (II) of at least one substantially sulfur free molecular weight modifier and (IV) up to 100 wt % relative to the sum of (I) and (II) of conventional additives for thermoplastic mold compositions, wherein the weight average molecular weight of said molding batch is in the range of $5 \times 10^4$ to $2.5 \times 10^5$.

5. The process as in claimed in claim 4 wherein (II) is selected from the group consisting of acrylic esters, methacrylic acid esters which are different from those in (I) vinyl acetate, vinyl chloride, vinylidene chloride, styrene, α-methylstyrene, halo substituted styrenes, vinyl ethers, isopropyl ether and dienes.

6. Process as claimed in claim 4 wherein the modifier (III) is selected from the group consistion of dimeric-α-methylstyrene, enolethers of aliphatic and/or cycloaliphatic aldehydes, terpenes, β-terpinene, terpinolene, cyclohexadiene, 1,4-cyclohexadiene, 1,4-dihydronaphthalene, 1,4,5,8-tertrahydronaphthalene, 2,5-dihydrofuran, 2,5-dimethylfuran and 3,6-dihydro-2H-pyran.

7. Process as claimed in claim 4 wherein (III) is present in an amount of 0.1 to 2 wt % relative to 100 wt % of the sum of components (I) and (II).

8. Process as claimed in claim 4 wherein the modifier (III) is a dimeric-α-methyl styrene.

9. Process as claimed in claim 4 wherein the weight average molecular weight is in the region of $8 \times 10^4$ through to $2 \times 10^5$.

10. The process as claimed in claim 1 wherein the non-ferrous metal is nickel.

11. The process as claimed in claim 4, wherein said molding composition comprises homo and/or copolymers of PMMA obtained by the polymerization of at least (I) and (II).

12. The process as claimed in claim 1, wherein said substantially sulfur-free thermoplastic PMMA has a sulfur content of less than 30 ppm.

13. The process as claimed in claim 1, wherein said substantially sulfur-free thermoplastic PMMA has a sulfur content of less than 10 ppm.

14. The process as claimed in claim 1, wherein said substantially sulfur-free thermoplastic PMMA has a sulfur content of less than 5 ppm.

15. The process as claimed in claim 5, wherein said molding composition comprises homo and/or copolymers of PMMA obtained by the polymerization of at least (I) and (II).

16. The process of claim 1, further comprising removing the molded article from the mold.

* * * * *

UNITED STATES PATENT AND TRADEMARK OFFICE
CERTIFICATE OF CORRECTION

PATENT NO. : 6,231,799 B1
DATED : May 15, 2001
INVENTOR(S) : Peter Kempf et al.

It is certified that error appears in the above-identified patent and that said Letters Patent is hereby corrected as shown below:

Title page,
Item [57], ABSTRACT,
Line 8, "where it necessary" should read -- where it is necessary --.

Column 1,
Line 32, "impurities in" should read -- in impurities in --.

Column 2,
Line 11, "metals one understands those" should read -- metals, one understands, are those --;
Line 42, "have an weight" should read -- have a weight --;

Column 3,
Line 3, "1,3-butyidiene," should read -- 1,3-butyldiene, --;
Line 8, "monomers commercially" should read -- monomers are commercially --;
Line 22, "62-terpinene," should read -- β-terpinene, --;
Line 26, "a-methylstyrene." should read -- α-methylstyrene. --;
Line 35, "becomes to large" should read -- becomes too large --;
Line 45, "2,5-dihyrofuran," should read -- 2,5-dihydrofuran, --;
Line 46, "3,6-dihyro-2H-pyran" should read -- 3,6-dihydro-2H-pyran --;
Line 65, "be an negative" should read -- be a negative --.

Column 4,
Line 43, "Verlag 1986 and 1989." should read -- Verlag 1986 and 1989.) --;
Line 56, "Because good heat conductivity hot" should read -- Because of good heat conductivity, hot --.

Column 6,
Line 31, "tools, it is" should read -- tools; it is --;
Line 42, "analysis carried" should read -- analysis was carried --;
Line 65, "compositions ere utilized" should read -- compositions were utilized --.

UNITED STATES PATENT AND TRADEMARK OFFICE
CERTIFICATE OF CORRECTION

PATENT NO. : 6,231,799 B1
DATED : May 15, 2001
INVENTOR(S) : Peter Kempf et al.

It is certified that error appears in the above-identified patent and that said Letters Patent is hereby corrected as shown below:

Column 7,
Line 9, "that Example" should read -- that of Example --;
Line 20, "tools were" should read -- tools which --;
Line 21, "certain necessitated" should read -- certainly necessitated --;
Line 49, "0.05 to wt % relative" should read -- 0.05 to 5 wt% relative --.

Signed and Sealed this

Third Day of September, 2002

Attest:

JAMES E. ROGAN
Attesting Officer
Director of the United States Patent and Trademark Office

UNITED STATES PATENT AND TRADEMARK OFFICE
CERTIFICATE OF CORRECTION

PATENT NO.    : 6,231,799 B1
DATED         : May 15, 2001
INVENTOR(S)   : Peter Kempf et al.

It is certified that error appears in the above-identified patent and that said Letters Patent is hereby corrected as shown below:

Column 7,
Line 49, delete "0.05 to wt%" and insert -- 0.05 wt% --.

Signed and Sealed this

Third Day of December, 2002

JAMES E. ROGAN
*Director of the United States Patent and Trademark Office*